United States Patent
Chien et al.

(10) Patent No.: US 9,996,844 B2
(45) Date of Patent: Jun. 12, 2018

(54) AGE-TARGETED ONLINE MARKETING USING INFERRED AGE RANGE INFORMATION

(75) Inventors: Shu-Yao Chien, Sunnyvale, CA (US); Linda S. Lee, Santa Clara, CA (US)

(73) Assignee: Excalibur IP, LLC, New York, NY (US)

( * ) Notice: Subject to any disclaimer, the term of this patent is extended or adjusted under 35 U.S.C. 154(b) by 1610 days.

(21) Appl. No.: 12/242,352

(22) Filed: Sep. 30, 2008

(65) Prior Publication Data

US 2010/0082360 A1    Apr. 1, 2010

(51) Int. Cl.
    *G06Q 30/02*    (2012.01)
(52) U.S. Cl.
    CPC ......... *G06Q 30/02* (2013.01); *G06Q 30/0255* (2013.01); *G06Q 30/0269* (2013.01)

(58) Field of Classification Search
    None
    See application file for complete search history.

(56) References Cited

U.S. PATENT DOCUMENTS

| | | | | |
|---|---|---|---|---|
| 7,676,392 | B2* | 3/2010 | Hedley | G07B 15/06 |
| | | | | 705/13 |
| 2001/0049620 | A1* | 12/2001 | Blasko | G06Q 10/10 |
| | | | | 705/14.53 |
| 2005/0131762 | A1* | 6/2005 | Bharat | G06Q 10/00 |
| | | | | 705/14.66 |
| 2010/0056872 | A1* | 3/2010 | Kahn et al. | 600/300 |

* cited by examiner

*Primary Examiner* — Florian M Zeender
*Assistant Examiner* — Denisse Y Ortiz Roman
(74) *Attorney, Agent, or Firm* — Mauriel Kapouytian Woods LLP; Lana Akopyan; James Woods (57) ABSTRACT

Particular embodiments of the invention are directed to generating marketing-based age range products based at least on inferred data regarding the age of various network users. The age range products may be used for age-targeted online marketing.

20 Claims, 6 Drawing Sheets

AGE-TARGETED ONLINE MARKETING USING INFERRED AGE RANGE INFORMATION

TECHNICAL FIELD

The present disclosure generally relates to targeted network marketing.

BACKGROUND

Internet marketing, also referred to as web marketing, online marketing, Internet advertising, or eMarketing, is the marketing of products or services over the Internet. The Internet has brought many unique benefits to marketing, one of which being lower costs for the distribution of information and media to a global audience. The interactive nature of Internet marketing, both in terms of providing instant response and eliciting responses, is a unique quality of the medium. Internet marketing is sometimes considered to have a broader scope because it refers to digital media such as the Internet, e-mail, and wireless media; however, Internet marketing also includes management of digital customer data and electronic customer relationship management (ECRM) systems.

Effective Internet marketing involves a comprehensive strategy that synergizes a given company's business model and sales goals with its website function and appearance, focusing on its target market through proper choice of advertising type, media, and design.

One widely used online marketing strategy is advertising by age range targeting, which may be referred to as age-targeted online marketing. Advertisers want high accuracy and sufficient inventory—i.e., sufficient numbers of age-targeted users to deliver their marketing content to. Thus, online advertising vendors (e.g., web sites) may attempt to identify the ages of users visiting their web sites. For example, some online advertising vendors utilize age information entered by users, e.g., during an online registration process to sign up for an online network or application.

SUMMARY

The present invention provides methods, apparatuses and systems directed to enhancing age-targeted online marketing. Particular implementations of the invention are directed to collecting user activity data regarding various network users, inferring age data for such users based on the collected user activity data, and generating age range products based at least on the inferred age data, the age range products being useful for age-targeted online marketing.

DESCRIPTION OF EXAMPLE EMBODIMENT(S)

A. Overview

Particular embodiments of the present invention are directed to generating age range products that may be used for age-targeted online marketing. Advertisers often specify an age range for targeted marketing, and vendors may generate age range products that identify network users believed to fall within the specified age range. Particular marketing materials may be directed to users identified in an age range product generated for an age range specified by the advertiser.

In particular embodiments of the present invention, age range products may be generated based on various models and rules, and may include determining an "inferred age" for individual users based on various user data, such as online activity history for such users, which may be collected using any suitable data mining techniques. In some implementations, the inferred data may be used to predict the age of various users, e.g., users that have not entered their age data and/or users that have entered false age data into an online network or service.

In addition, in some implementations, inferred age data for certain users may be analyzed along with age data entered by such users in order to predict the actual age of such users. Predicting the ages of network users using the techniques disclosed herein may allow a vendor (or other entity) to generate age range products that are more inclusive and/or more accurate than using existing techniques.

In addition, in particular embodiments of the present invention, age range products may be generated by combining multiple age ranges that have been populated with users (e.g., based on their predicted ages). For example, some age range products may be generated by combining age ranges having different levels of "granularity"—e.g., a 5-year age range may be combined with a 25-year age range in order to generate a 30-year age range product requested by an advertiser. Using such a multi-granular approach may produce age range products that are more inclusive and/or more accurate than using existing techniques. For example, a 30-year age range product based on a combination of a 5-year age range and a 25-year age range will is likely to be more inclusive and/or more accurate than a similar 30-year age range product based on a combination of six different 5-year ranges.

The present invention can be implemented in a variety of manners, as discussed in more detail below. Other implementations of the invention may be practiced without some or all of specific details set forth below. In some instances, well known structures and/or processes have not been described in detail so that the present invention is not unnecessarily obscured.

A.1. Example Network Environment

Particular implementations of the invention operate in a wide area network environment, such as the Internet, including multiple network addressable systems. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like.

Figure 2:
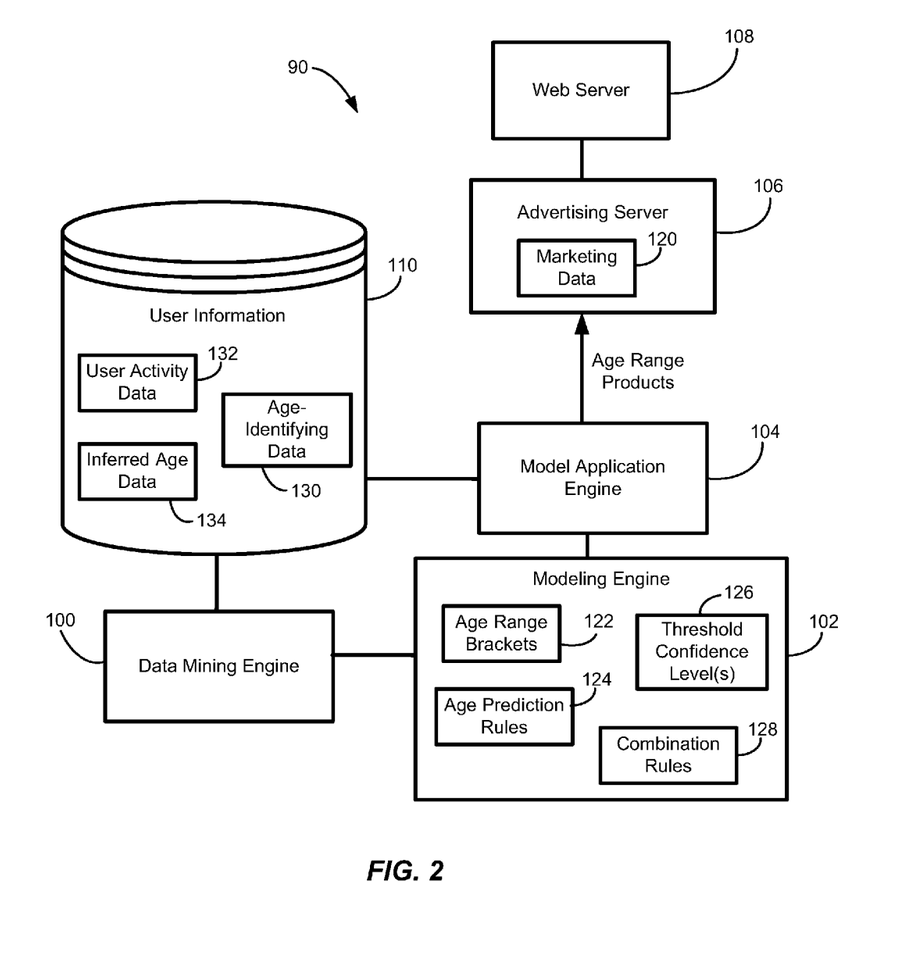
FIG. 2 is a functional block diagram illustrating the functionality of an example age-targeted marketing system to which implementations of the invention have application.

As FIG. 2 illustrates, a particular implementation of the invention can operate in a network environment 10 comprising network application hosting site 20, such as an informational web site, social network site and the like.

Although FIG. 2 illustrates only one network application hosting site, implementations of the invention may operate in network environments that include multiples of one or more of the individual systems and sites disclosed herein. Client nodes 82, 84 are operably connected to the network environment via a network service provider or any other suitable means.

Network application hosting site 20 is a network addressable system that hosts a network application accessible to one or more users over a computer network. The network application may be an informational web site where users request and receive identified web pages and other content over the computer network. The network application may also be a search platform, an on-line forum or blogging application where users may submit or otherwise configure content for display to other users. The network application may also be a social network application allowing users to configure and maintain personal web pages. The network application may also be a content distribution application, such as Yahoo! Music Engine®, Apple® iTunes®, podcasting servers, that displays available content, and transmits content to users.

Network application hosting site 20, in one implementation, comprises one or more physical servers 22 and content data store 24. The one or more physical servers 22 are operably connected to computer network 60 via a router 26. The one or more physical servers 22 host functionality that provides a network application (e.g, a news content site, etc.) to a user. In one implementation, the functionality hosted by the one or more physical servers 22 may include web or HTTP servers and the like. Still further, some or all of the functionality described herein may be accessible using an HTTP interface or presented as a web service using SOAP or other suitable protocols. In some implementations, one or more physical servers 22 may provide any of the functionality discussed below, e.g., for collecting network activity data and/or age-related data regarding various network users, inferring age probabilities based on user network activity data, and generating age range products (e.g., groups of users corresponding to particular age range brackets) for use in online marketing.

Content data store 24 stores content as digital content data objects. A content data object or content object, in particular implementations, is an individual item of digital information typically stored or embodied in a data file or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Structurally, content data store 24 connotes a large class of data storage and management systems. In particular implementations, content data store 24 may be implemented by any suitable physical system including components, such as database servers, mass storage media, media library systems, and the like.

Network application hosting site 20, in one implementation, provides web pages, such as front pages, that include an information package or module describing one or more attributes of a network addressable resource, such as a web page containing an article or product description, a downloadable or streaming media file, and the like. The web page may also include one or more ads, such as banner ads, text-based ads, sponsored videos, games, and the like. Generally, web pages and other resources include hypertext links or other controls that a user can activate to retrieve additional web pages or resources. A user "clicks" on the hyperlink with a computer input device to initiate a retrieval request to retrieve the information associated with the hyperlink or control. In some implementations of network application hosting site 20, network application hosting site 20 may be operative to collect and analyze age-related data regarding network users and generate age range products (e.g., groups of users corresponding to particular age range brackets) for use in online marketing.

A.2. Client Nodes & Example Protocol Environment

Client node is a computer or computing device including functionality for communicating over a computer network. A client node can be a desktop computer 82, laptop computer, as well as mobile devices 84, such as cellular telephones, personal digital assistants. A client node may execute one or more client applications, such as a web browser, to access and view content over a computer network. In particular implementations, the client applications allow users to enter addresses of specific network resources to be retrieved. These addresses can be Uniform Resource Locators, or URLs. In addition, once a page or other resource has been retrieved, the client applications may provide access to other pages or records when the user "clicks" on hyperlinks to other resources. In some implementations, such hyperlinks are located within the web pages 30 and provide an automated way for the user to enter the URL of another page and to retrieve that page. The pages or resources can be data records including as content plain textual information, or more complex digitally encoded multimedia content, such as software programs or other code objects, graphics, images, audio signals, videos, and so forth.

The networked systems described herein can communicate over the network 60 using any suitable communications protocols. For example, client nodes 82, 84, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. Still further, in particular implementations, the information transmitted between hosts may be formatted as HyperText Markup Language (HTML) documents. Other structured document languages or formats can be used, such as XML, and the like.

In some client-server protocols, such as the use of HTML over HTTP, a server generally transmits a response to a request from a client. The response may comprise one or more data objects. For example, the response may comprise a first data object, followed by subsequently transmitted data objects. In one implementation, for example, a client request may cause a server to respond with a first data object, such as an HTML page, which itself refers to other data objects. A client application, such as a browser, will request these additional data objects as it parses or otherwise processes the first data object.

Mobile client nodes 84 may use other communications protocols and data formats. For example, mobile client nodes 84, in some implementations, may include Wireless Application Protocol (WAP) functionality and a WAP browser. The use of other wireless or mobile device protocol suites are also possible, such as NTT DoCoMo's i-mode wireless network service protocol suites. In addition, the network environment may also include protocol translation gateways, proxies or other systems to allow mobile client nodes 84, for example, to access other network protocol environments. For example, a user may use a mobile client node 84 to capture an image and upload the image over the carrier network to a content site connected to the Internet.

A.3. Targeted Marketing System

FIG. 2 illustrates age-targeted marketing system 90 for modeling and generating marketing-related age range products useful for age-targeted marketing, according to one particular implementation. Age-targeted marketing system 90 may include various functional modules hosted by network application hosting site 20. As FIG. 2 illustrates, targeting marketing system 90 may comprise data mining engine 100, modeling engine 102, product generation engine 104, ad server 106, web server 108, and user information database 110, some or all of which may be hosted by network application hosting site 20. The foregoing functional modules may be realized by hardware, executable modules stored on a computer readable medium, or a combination of both. The functional modules, for example, may be hosted on one or more of physical servers 22.

Web server 108 is an executable module that accepts HyperText Transport Protocol (HTTP) requests from web clients, such web browser client applications hosted on client computers 82, 84, and serving HTTP responses including data contents, such as HyperText Markup Language (HTML) documents and linked objects (images, advertisements, etc.). Web server 108, as discussed above, may operate to deliver a network application, such as an informational web page, an internet search service, or a social network application, for example, del.icio.us (http://del.icio.us/), facebook (http://www.facebook.com), Yahoo! Movies (http://movies.yahoo.com), Yahoo! Music (http://music.yahoo.com), Flickr (http://www.flickr.com), etc.

In certain implementation, web server 108 is further operative to deliver marketing data 120 maintained by ad server 106 to particular network users (e.g., via client computers 82, 84) as directed by ad server 106. For example, as discussed below, web server 108 is further operative to deliver marketing data 120 to a specific targeted age range of users defined by an "age range product" corresponding to the specific age range.

Ad server 106 is operative to select marketing data 120 for inclusion in web pages and other content transmitted to web site users by web server 108. Marketing data 120 may include any advertisements or other marketing materials, e.g., banner ads, text ads and/or any other digital objects associated with advertiser sponsored content. For example, the ads may be banner ads to be transmitted in connection with a home page. The ads may be text based ads transmitted as sponsored search results in connection with a search results page. In one implementation, ad server 106 selects ads in response to a retrieval request from web server 108. The retrieval request may identify the web page Uniform Resource Locator (URL) requested by the user, the IP address associated with the user, an account identifier associated with the user.

Ad server 106 may access product generation engine 104 to identify particular network users to serve marketing data 120 to, e.g., via web sites accessed by such identified users. For example, as discussed below, ad server 106 may access "age range products" from product generation engine 104 that identify groups of users having a predicted age within particular age range brackets. An "age range product" may be defined as group of users of a network (e.g., a social networking application) having a predicted age within a particular age range, e.g., as specified by an advertiser.

A "predicted age" for a user is an estimated or "most likely" age for the user, determined by on analysis of user information regarding the user, including for example, age-identifying data (e.g., an age entered by the user during registration to an online social network or other online application), user activity data for the user (e.g., the user's web browsing history, the user's actions on a social network or other online application, the user's interactions with other users, the user's online purchasing history, the social network or other online memberships of the user, etc.), and/or any other data from which the user's age may be determined or estimated.

Some age range products may be made up of a combination of multiple "age range populations," which may be combined to form the age range product. This type of age range product may be referred to as a "combination age range product." Like an "age range product," each "age range population" may be defined as group of users of a network (e.g., a social networking application) having a predicted age within a particular age range bracket. For example, a combination age range product identifying users aged 25,64 may be a combination of three age range populations: (1) a first age range project identifying users aged 25,54, (2) a second age range project identifying users aged 55,59, and (3) a third age range project identifying users aged 60,64.

As discussed below, in some embodiments, age-targeted marketing system 90 may determine and manage age range populations for a variety of age ranges at different levels of granularity, e.g., a set of ten consecutive 5-year age ranges (first level of granularity) and a number of larger age ranges (second level of granularity) that may overlap certain 5-year ranges. In the example discussed in the preceding paragraph, the 25-64 combination age range product is a combination of one age range population (25,54) at a first, 20-year range level of granularity and two age range populations (55,59 and 60,64) at a second, 5-year range level of granularity. This type of combination age range product—including age range populations from multiple levels of granularity—may be referred to as a "multi-granular age range product."

Modeling engine 102 is operative to perform age range and prediction modeling. Age range modeling generally includes building models of age ranges, which may include age range at different levels of granularity, and models for combining multiple age ranges to form age range products that may, for example, be sold to advertisers. Age prediction modeling generally includes building models for predicting ages of users, that may be used (by product generation engine 104) for populating various modeled age ranges, in order to generate age range populations and age range products, including combination age range products (multi-granular or otherwise). Age range and prediction modeling are discussed in greater detail below, e.g., in Section B.

Product generation engine 104 is operative to generate age range populations and age range products (including combination age range products) based on models generated or maintained by modeling engine 102. Product generation engine 104 may access user information 110 from storage, and cooperate with modeling engine 102 to apply various models or rules from modeling engine 102 to the accessed user information 110 in order to generate various age range populations and age range products as desired. For example, with reference to FIG. 2, product generation engine 104 may apply age prediction rules 124, threshold confidence levels 126, and combination rules 128 to age identifying data 130, user activity data 132, and/or inferred age data 134 in order to generate various age range populations and age range products, e.g., as discussed below in Section B. Product generation engine 104 may comprise, or have access to any suitable algorithms or logic for applying various models and rules from modeling engine 102 to user information 110 in order to generate age range populations and age range products.

Data mining engine 100 is operative to perform various data mining functions to generate data regarding network users, including user activity data 132. Data mining engine 100 may analyze and discover interesting patterns of a user's usage data on a network, e.g., the Internet or a particular social network application. The usage data may records the user's browsing and transaction behavior: for example, which sites a user visits, for how long, which hyperlinks the user clicks, the user's actions and transactions on particular web pages, the user's interaction with other users, etc. Data mining engine 100 may utilize automatic discovery of patterns from one or more Web servers, and store the collected user data as user activity data 132. Data mining engine 100 may utilize any known data mining techniques, e.g., various Pattern Discovery Tools and Pattern Analysis Tools, for collecting user activity data 132.

B. Example Operation

B.1. Age-Targeted Marketing System Operation

As discussed above, age-targeted marketing system 90 is operative to model and generate marketing-related age range products useful for age-targeted marketing. According to certain implementations, modeling engine 102 may generate various age range models and age prediction models for generating various age range populations and/or age range products, based on various rules, e.g., as discussed below. Product generation engine 104 may access and apply such age range age range models and age prediction models to various ser information 110 accessed from storage, in order to generate various age range populations and/or age range products. For example, product generation engine 104 may score individual network users based on age prediction models from modeling ending 102 to determine one or more age range populations in which to include each individual network user. In some instances, product generation engine 104 may apply various combination rules from modeling engine 102 to combine various age range populations to build combination age range products, which may include multi-granular and/or single-granular combination age range products.

Ad server 106 may maintain marketing data 120 (e.g., web-based advertisements), access age range products from product generation engine 104, and direct particular marketing data 120 to particular users via web server 108 based on such accessed age range products. For example, web server 108 may send an ad call to ad server 106 querying for relevant marketing data 120 (if any) to deliver to a particular user, e.g., when a particular user browses to a particular web page or at any other suitable time. In response to the ad call, ad server 106 may determine whether any particular marketing data 120 should be delivered to the particular user, based on whether the particular user is identified in the age range products corresponding to particular marketing data 120. For example, suppose marketing data 120 includes an advertisement for a certain type of car, and modeling engine 102 and product generation engine 104 have cooperated to generate an age range product corresponding to the car ad (e.g., the age range product specifying users age 16-35). Web server 108 may identify a particular user, User A, currently online and send the identity of User A to ad server 106. Ad server 106 may determine whether User A is identified in the (16,35) age range product for the car ad, and if so, notify web server 108 such that web server 108 may deliver the car ad to User A (e.g., as an embedded ad in a particular web page).

Various techniques for modeling and scoring user data in order to generate age range products for use by ad server 106 and web server 108 are discussed in detail below.

B.2. Age Range Modeling

Modeling engine 102 may generate and/or maintain age range models for groups of age range at different levels of granularity, each set including one or more age range. Such age ranges may be determined by modeling engine 102 (e.g., based on statistical algorithms), specified by advertisers, or otherwise determined or specified. For example, modeling engine 102 may generate (a) a first set of 1-year age range models (20) (21) (22) (23) . . . , (b) a second set of 5-year age range models (20,24) (25,29) (30,34) (35,39) (40,44) (45-49) (50,54) . . . , (c) a third set of 10-year age range models (20,29) (30,39) (40,49) (50-59) . . . , and (d) a fourth set of 15-year age range models (20,34) (35,49) . . . The four sets of age range models represent four different levels of granularity, with granularity decreasing from the first set to the fourth set. The age ranges modeled by modeling engine 102 are indicated in FIG. 2 as age range brackets 122.

As seen in this example, age ranges from different levels of granularity may at least partially overlap each other. For instance, age range (20,34) from granularity level four overlaps (20,29) and (30,39) from granularity level three, and also overlaps (20,24) (25,29) and (30,34) from granularity level two. In some instances, modeling engine 102 may model only a single age range for a certain level of granularity, e.g., an 18-65 age range.

In some embodiments, modeling engine 102 may generate age range models for common vendor-defined age ranges, e.g., (13,17) (18,24) (25,29) (30,34) (35,39) (40,44) (45-49) (50,54) (55,59) (60,64) (65+), as well as popularly sold (or advertiser-specified) age ranges, e.g., (25,54) (18, 100) (18,34) (18,49) (18,44) (35,92). Popularly sold age ranges are typically larger than vendor-defined age ranges, as in this example.

From the perspective of age prediction modeling (discussed below), building models for larger age ranges can usually capture more users and provide a higher precision level, as compared to an aggregate of several smaller ranges. For example, a prediction model for the age range (18,34) will usually capture more users, and with greater accuracy, than the aggregate of smaller age ranges (18,24), (25,29), and (30,34), according to basic principles of statistics. Generally, the larger the age range, the more inclusive and more accurate the age range population determined for that age range. Thus, as discussed below, to build a model for a new age range (e.g., an age range proposed by an advertiser) that does not match any existing modeled age range, modeling engine 102 may combine the largest (i.e., least granular) existing modeled age ranges that can be combined to provide the new age range. This technique will typically produce a more inclusive and accurate group of users in the new age range, as compared to prior techniques.

For example, consider the example above, where modeling engine 102 maintains models for common vendor-defined age ranges (13,17) (18,24) (25,29) (30,34) (35,39) (40,44) (45-49) (50,54) (55,59) (60,64) (65+) and popularly sold age ranges, e.g., (25,54) (18,100) (18,34) (18,49) (18, 44) (35,92). To build a model for a new age range (13,39), which does not match any existing modeled age range, modeling engine 102 may combine the largest age range within the (13,39) age range—namely (18,34)—and fill in the front and back ends with the smaller modeled age ranges (13,17) and (35,39). Modeling the new age range in this manner will typically provide a more inclusive and more accurate age range product than compared to a similar model combining the smaller age ranges (13,17) (18,24) (25,29) (30,34) and (35,39).

B.3. Age Prediction Modeling

For each age group supported by modeling engine 102, modeling engine 102 specifies age prediction rules 124 usable by product generation engine 104 for populating each modeled age group with network users. For example, modeling engine 102 may generate or specify various age prediction rules 124 for predicting the age of individual users. Age prediction rules 124 may be used (by product generation engine 104) to determine the probability, or "confidence level," that each analyzed user falls within each of a number of different age ranges. Such probability data regarding whether particular users fall within particular age ranges may be referred to as "inferred age data" 134, as such probability data is "inferred" from various input data, as discussed below.

Age prediction rules 124 may include any suitable algorithms for determining probabilities of particular users falling within particular age ranges based on various input. For example, age prediction rules 124 may specify a particular type of prediction model, various types of input data (e.g., the user's self-reported age, web browsing history, actions on a social network or other online application, interactions with other users, online purchasing history, online memberships of the user, etc.), and any relevant algorithms. Example types of prediction models usable by modeling engine 102 include a linear regression model, a support vector machine, a neural network, or any other known model of statistical data mining analysis.

Figure 1:
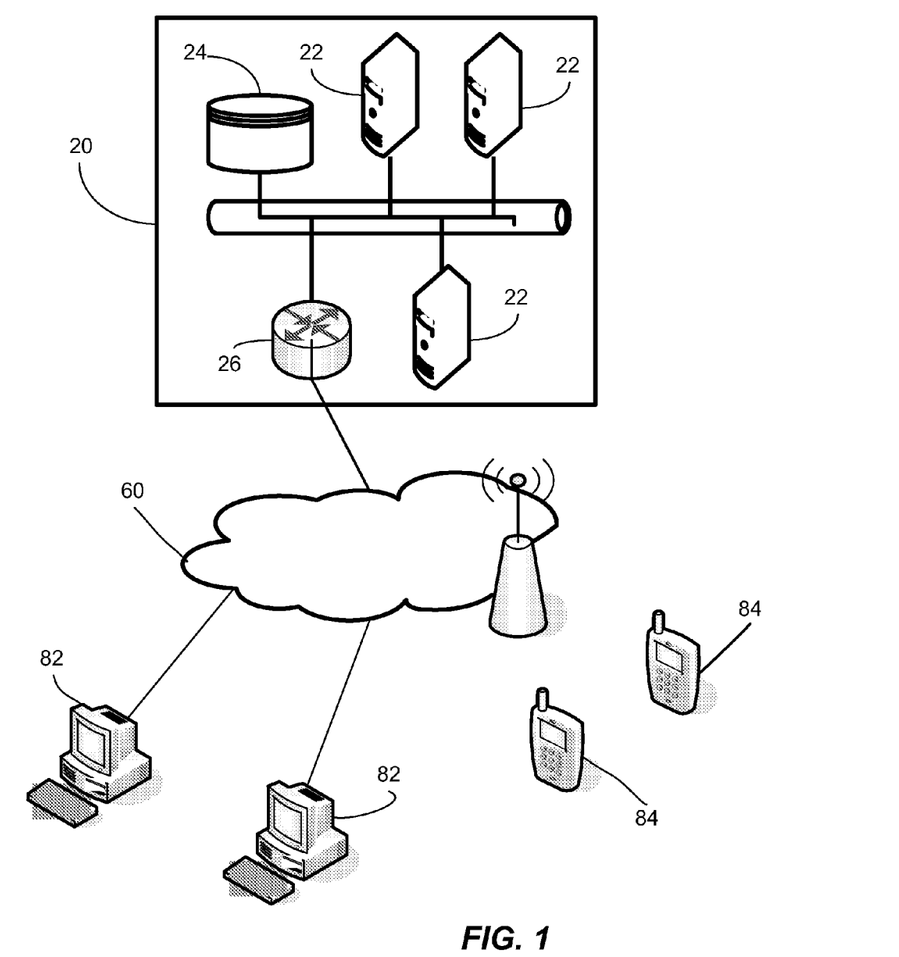
FIG. 1 is a schematic diagram that illustrates an example network environment in which particular implementations of the invention may operate.

Input data specified by age prediction rules 124 for predicting the age of individual users may include various user information 110, which may be maintained in content data store 24 shown in FIG. 1, for example. User information 110 may include age-identifying data 130, user activity data 132, and/or any other data relevant to one or more users. Age-identifying data 130 includes data identifying the reported ages of various users. Such data may be reported by any entity. For example, age-identifying data 130 may include age data that is self-reported by users, e.g., as part of the demographic data that users enter when registering for an online service, transaction, or network (e.g., during registration for a Yahoo! user account). Age-identifying data 130 may include false, or inaccurate, age data for certain users. For example, many online users who wish to maintain privacy of their demographic data enter false data, including false age data, during an online registration process. For instance, some users may enter their age as 99. Thus, age-identifying data 130 is typically accurate (at least to the year, if not to the month or exact date) for some users, and inaccurate (often grossly) for other users.

User activity data 132 may include any data regarding various users' activities on a network or online application. For example, user activity data 132 may include the user's web browsing history, which sites a user visits, for how long, which hyperlinks the user clicks, the user's actions and transactions on particular web pages, the user's interactions with other users, the user's online purchasing history, the social network or other online memberships of the user, etc.

User activity data 132 may be collected by data mining engine 100 or from any other source (e.g., self-reported by individual users).

Thus, an age range model generated by modeling engine 102 may be used to determine the probability, or "confidence level," that each analyzed user falls within that age range, which may be saved as inferred age data 134. The confidence levels for each user may be determined based on an analysis of user activity data 132 for that user, or based on an analysis of user activity data 132 and age-identifying data 130 for that user. As an example of the latter, an age prediction model may specify rules for determining, based on an analysis of user activity data 132 and age-identifying data 130 for a particular user, whether to (a) accept the user's age as specified by age-identifying data 130 or (b) override the age specified by age-identifying data 130 with a predicted age based on user activity data 132.

Modeling engine 102 may specify for each age range the required confidence level, referred to as a "confidence level threshold" 126, for including users in the age range population for that age range. Such confidence level threshold may thus be used to determine whether each analyzed user qualifies for each of a number of different age range populations. For example, supposing the age range model for each age range (20,29), (30,30), and (40,49) specifies a confidence level threshold of 55%, each user determined with at least 55% probably to fall within the 20-29 age range qualifies for inclusion in the (20,29) age range population. Similarly, each user determined with at least 55% probably to fall within the 30-39 age range qualifies for inclusion in the (30,39) age range population, and each user determined with at least 55% probably to fall within the 40-49 age range qualifies for inclusion in the (40,49) age range population.

The confidence level threshold 126 for each age range may be the same or different. For example, the specified confidence level threshold 126 may be the same for each age range within the same level of granularity, but different from the specified confidence level threshold for age ranges in other levels of granularity. As another example, the specified confidence level threshold 126 may be the different for different age ranges within the same level of granularity. For example, in the example above, the age range model may specify a confidence level threshold of 50% for age ranges (20,29) and (30,30), and 60% for age range (40,49). The confidence level threshold 126 for each age range may be determined in any manner, and may be static or dynamic. For example, confidence level thresholds 126 may be specified by a user, e.g., via a client node 82, 84, and adjusted over time as desired. For example, a user may increase one or more confidence level thresholds 126 if the user believes that all or certain age range populations generated by system 90 are capturing too many users (e.g., due to excessive false positives), or decrease one or more confidence level thresholds 126 if the user believes that all or certain age range populations generated by system 90 are capturing too few users (e.g., due to excessive false negatives). Alternatively, modeling engine 104 may set confidence level thresholds 126, and in some implementations, may automatically adjust one or more of such thresholds 126 over time based on any suitable criteria.

B.4. Combining Data for Age Range Populations and Age Range Products

Modeling engine 102 may also specify combination models or rules 128 for combining different types of data for generating age range populations and age range products. For example, for each age range, modeling engine 102 may specify combination rules 128 for combining inferred age data 134 and age-identifying data 130 to generate an age range population for that age range. Combination rules 128 may specify how to combine (a) inferred age data 134 for a group of users with age-identifying data 130 for the same first group of users, (b) inferred age data 134 for a first group of users with age-identifying data 130 for a second, partially overlapping group of users, and/or (c) inferred age data 134 for a first group of users with age-identifying data 130 for a second, non-overlapping group of users.

For example, to generate a desired age range population according to situation (c), system 90 may (a) identify from the first group of users a first sub-group having a predicted age within the relevant age range based on inferred age data 134 for such users (e.g., using any of the techniques discussed herein), and (b) identify from the second group of users a second sub-group having an identified age within the relevant age range based on age-identifying data 130 for such users. Combination rules 128 may specify to combine the identified first sub-group of users with the identified first sub-group of users to generate the desired age range population.

Various types of combination models 128 may be provided for handling users for which both inferred age data 134 and age-identifying data 130 is available, e.g., as in situations (a) and (b) listed above. For example, a first example combination model 128, "CM1," may specify that each user qualifies for an age range population if either (a) the inferred age data 134 indicates, with a confidence level above the relevant confidence level threshold, that the user falls within the age range, or (b) the age-identifying data 130 indicates that the user falls within the age range.

To illustrate, suppose the following data for a particular user:
Age-identifying data 130 indicates the user is 43;
Inferred age data 134 indicates age (20,29) with a 55% confidence level;
Inferred age data 134 indicates age (30,39) with a 35% confidence level;
Inferred age data 134 indicates age (40,49) with a 10% confidence level;
Relevant confidence level threshold=50%.

According to model CM1, the user would qualify for both the (20,29) age range population (based on the user's inferred data) and the (40,49) age range population (based on the user's age-identifying data).

A second example combination model 128, "CM2," may specify that each user qualifies for an age range population only if both (a) the inferred age data 134 indicates, with a confidence level above the relevant confidence level threshold, that the user falls within the age range, and (b) the age-identifying data 130 indicates that the user falls within the age range.

To illustrate, again suppose the following data for a particular user:
Age-identifying data 130 indicates the user is 43;
Inferred age data 134 indicates age (20,29) with a 55% confidence level;
Inferred age data 134 indicates age (30,39) with a 35% confidence level;
Inferred age data 134 indicates age (40,49) with a 10% confidence level;
Relevant confidence level threshold=50%.

According to model CM2, the user would not qualify for any of the three age range populations (20,29) (30,39) or (40,49).

A third example combination model 128, "CM3," is a modified version of either the first or second example combination rules 128, but prevents the user from being included in more than one age range population in any set of non-overlapping, same-granular-level age ranges. The model may thus include any suitable tiebreak rules for selecting a single age range population when a particular user qualifies for multiple age range populations.

For example, where the user qualifies for multiple age range populations based on inferred age data, but none based on age-identifying data 130, the tiebreak rules may specify that the user is included only for the age range population for which the inferred age data indicates the highest confidence level.

To illustrate, suppose the following data for a particular user:
No age-identifying data 130;
Inferred age data 134 indicates age (20,29) with a 45% confidence level;
Inferred age data 134 indicates age (30,39) with a 55% confidence level;
Inferred age data 134 indicates age (40,49) with a 10% confidence level;
Relevant confidence level threshold=40%;

Based on the 40% confidence level threshold, the user qualifies for both the (20,29) and (30,39) age range populations. However, CM3 limits the user to one age range population. Based on the example tiebreak rules discussed above, the age range with the highest confidence level is selected. Thus, the user is included in the (30,39) age range population, and not the (20,29) age range population.

As another example, where the user qualifies for both (a) a first age range population based on inferred age data, and (b) one or more second age range populations (distinct from the first age range population) based on inferred age data, the tiebreak rules may specify an elevated secondary confidence level threshold applied to the inferred age data for each of the second age range populations. For instance, the elevated secondary confidence level threshold may be 20% higher than the primary confidence level threshold. The tiebreak rules may specify that the user be included in one of the second age range populations (the one having the highest confidence level) if the inferred age data indicates a confidence level exceeding the elevated secondary confidence level threshold for any of the second age range populations. If the inferred age data does not indicate a confidence level exceeding the elevated secondary confidence level threshold for any of the second age range populations, the user is included in the first age range population indicated by the inferred age data.

To illustrate, again suppose the following data for a particular user:
Age-identifying data 130 indicates the user is 43;
Inferred age data 134 indicates age (20,29) with a 55% confidence level;
Inferred age data 134 indicates age (30,39) with a 35% confidence level;
Inferred age data 134 indicates age (40,49) with a 10% confidence level;
Relevant (primary) confidence level threshold=50%;
Elevated secondary confidence level threshold=70%.

Assuming CM3 is a modified version of CM1 discussed above, the user qualifies for both the (20,29) and (40,49) age range populations. However, CM3 limits the user to one age range population. Based on the example tiebreak rules discussed above, the age range specified by the age-identifying data 130, (40,49), is selected because the 55% confidence level for the (20,29) age range does not exceed the elevated confidence level threshold of 70% for (20,29)

range. Thus, the user is included in the (40,49) age range population, and not the (20,29) age range population.

As another example, where the user qualifies for both (a) a first age range population based on inferred age data, (b) the first age range population based on inferred age data, and (c) one or more second age range populations (distinct from the first age range population) also based on inferred age data, the tiebreak rules may specify a lowered secondary confidence level threshold applied to the inferred age data for the first age range population. For instance, the lowered secondary confidence level threshold may be 15% lower than the primary confidence level threshold. The tiebreak rules may specify that the user be included in the first age range population if the inferred age data indicates a confidence level exceeding the lowered secondary confidence level threshold for the first age range population. If the inferred age data does not indicate a confidence level exceeding the lowered secondary confidence level threshold for the first age range population, the user is included in the second age range population having the highest confidence level based on the inferred age data.

To illustrate, suppose the following data for a particular user:

Age-identifying data 130 indicates the user is 43;
Inferred age data 134 indicates age (20,29) with a 5% confidence level;
Inferred age data 134 indicates age (30,39) with a 55% confidence level;
Inferred age data 134 indicates age (40,49) with a 40% confidence level;
Relevant (primary) confidence level threshold=50%;
Lowered secondary confidence level threshold=35%.

Assuming CM3 is a modified version of CM1 discussed above, the user qualifies for both the (30,39) and (40,49) age range populations. However, CM3 limits the user to one age range population. Based on the example tiebreak rules discussed above, the age range specified by the age-identifying data 130, (40,49), is selected because the 40% confidence level for the (40,49) age range exceeds the lowered confidence level threshold of 35% for the (40,49) range. Thus, the user is included in the (40,49) age range population, and not the (30,39) age range population.

As discussed above, modeling engine may generate age range models for age range populations at different levels of granularity, which may be combined to generate combination age range products (e.g., for advertiser-specified age ranges). Combination models 128 may specify rules for combining age range populations to generate combination age range products, including both multi-granular and single-granular combination age range products. Combination models 128 may specify rules for combining any number of age range populations from the same level of granularity or any number of different levels of granularity.

As discussed above, in general, the larger the age range, the more inclusive and more accurate the age range population determined for that age range. Thus, combination models 128 may specify rules for generating age range products for an ages ranges not already modeled (e.g., an age range proposed by an advertiser), where the rules specify to combine the largest (i.e., least granular) existing age range products that can be combined to provide the desired combination age range product. This technique will typically produce a more inclusive and accurate group of users in the new age range, as compared to prior techniques, as illustrated in the following example.

Example: Suppose existing age range populations include the following age ranges and levels of granularity:

Granularity Level 1: (13,17) (18,24) (25,29) (30,34) (35,39) (40,44) (45,49) (50,54) (55,59) (60,64) (65+);
Granularity Level 2: (20,29) (30,39) (40,49) (50,59) (60+);
Granularity Level 3: (25,54); and
Granularity Level 4: (18,65)

Further, suppose four particular Users 1-5 having no associated age-identifying data 130 (or no reliable data 130). Assume a specified confidence level threshold of 50% for all age ranges. Further assume that, based on the age inferred data 134 (as calculated by product generation engine 104), each cookie qualifies for the following age range populations listed above (based on a confidence level above 50% for such age range populations):

User 1: (35,39) (30,39) (25,54) and (18,65);
User 2: (25,54) and (18,65);
User 3: (40,49) (25,54) and (18,65);
User 4: (55,59) (50,59) (25,54) and (18,65);
User 5: (18,65);

Now suppose that age-targeted marketing system 90 needs to generate an age range product for an age range (25,59), e.g., as requested by a customer, such as an advertiser wishing to deliver his marketing content to users in the 25-59 age bracket. Modeling engine 102 could build the (25,59) age range product using various combinations of existing age range populations listed above in Granularity Levels 1-4, including:

Combination A: (25,29)+(30,34)+(35,39)+(40,44)+(45,49)+(50,54)+(55,59);
Combination B: (25,29)+(30,39)+(40,49)+(50,54); and
Combination C: (25,54)+(54,59).

Based on the qualified age ranges for cookies 1-5 listed above, Combination A captures Users 1 and 4; Combination B captures Users 1, 3, and 4; and Combination C captures Users 1, 2, 3, and 4. Thus, Combination C (the least granular combination) captures 4 users, Combination B captures 3 users, and Combination A (the most granular combination) captures only 2 users. This example illustrates that by using multiple levels of granularity, and combining the largest age ranges available (i.e., minimizing the granularity of combination), the number of users captured in the combination age range product may be increased or even maximized.

B.5. Example Methods

Figure 3:
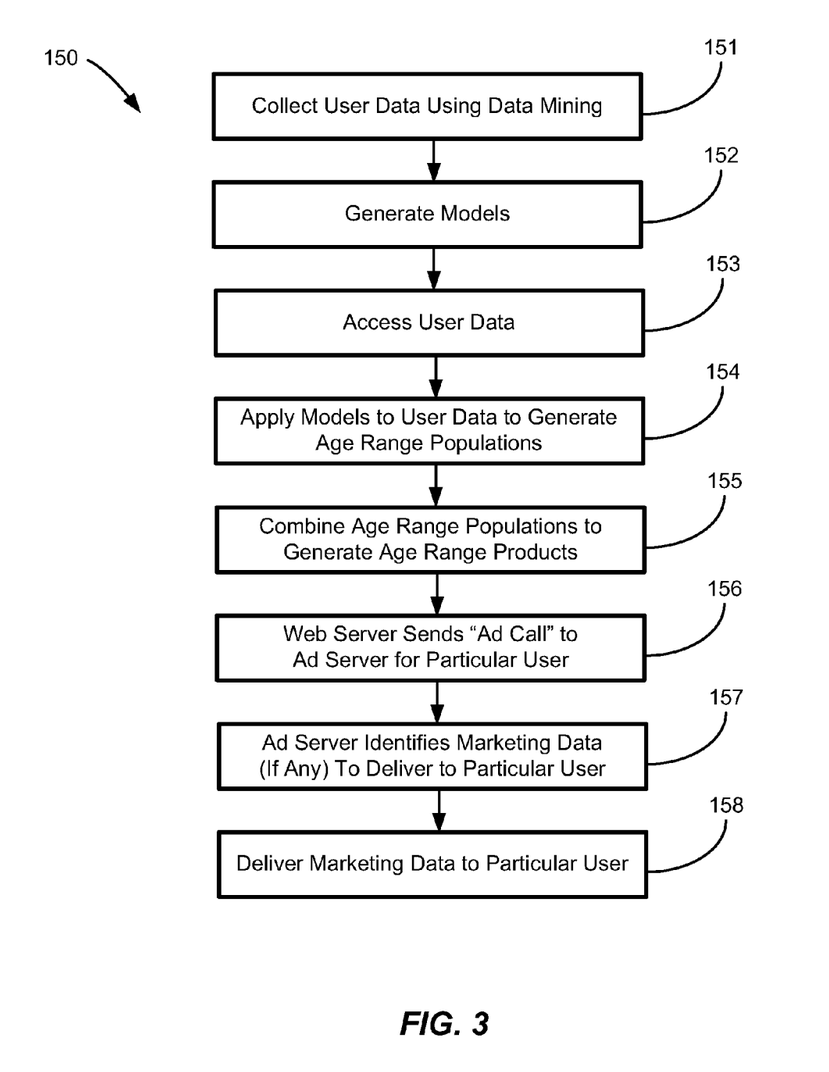
FIGS. 3, 4 and 5 are flow charts showing example methods associated with particular implementations of the invention.

FIG. 3 illustrates an example process 150 for age-targeted marketing that may be implemented by age-targeted marketing system 90 according to certain embodiments. At step 151, data mining engine 100 may collect various user information 110 regarding any number of network users, e.g., using any suitable data mining techniques. For example, data mining engine 100 may college user activity data 132 regarding various user's online activity. In addition, some network user may self-report various user information, including age identifying data 130, e.g., while registering for an online network, service, or application.

At step 152, modeling engine 102 may generate various age range models and age prediction models for generating various age range populations and/or age range products, based on various rules, e.g., as discussed above. At step 153, product generation engine 104 may access user information 110 from storage. At step 154, product generation engine 104 may apply various age range age range models and age prediction models from modeling engine 102 to user information 110 accessed from storage, in order to generate various age range populations. For example, product generation engine 104 may score individual network users based on age prediction models from modeling ending 102 to determine one or more age range populations in which to include each individual network user. At step 155, product generation engine 104 may apply various combination rules from modeling engine 102 to combine various age range populations to build combination age range products, which may include multi-granular and/or single-granular combination age range products.

At step 156, web server 108 may send an ad call to ad server 106 querying for relevant marketing data 120 (if any) to deliver to a particular user, e.g., when a particular user browses to a particular web page or at any other suitable time. The ad call may identify the particular user. In response, at step 157, ad server 106 may determine whether any particular marketing data 120 should be delivered to the particular user, based on whether the particular user is identified in the age range products corresponding to particular marketing data 120, and notify web server 108 accordingly. At step 158, if ad server 106 has notified web server 108 that the particular user is identified for receiving particular marketing data 120, web server 108 may deliver the particular marketing data 120 to the particular user, e.g., as an embedded ad in a particular web page or in any other suitable manner.

Figure 4:
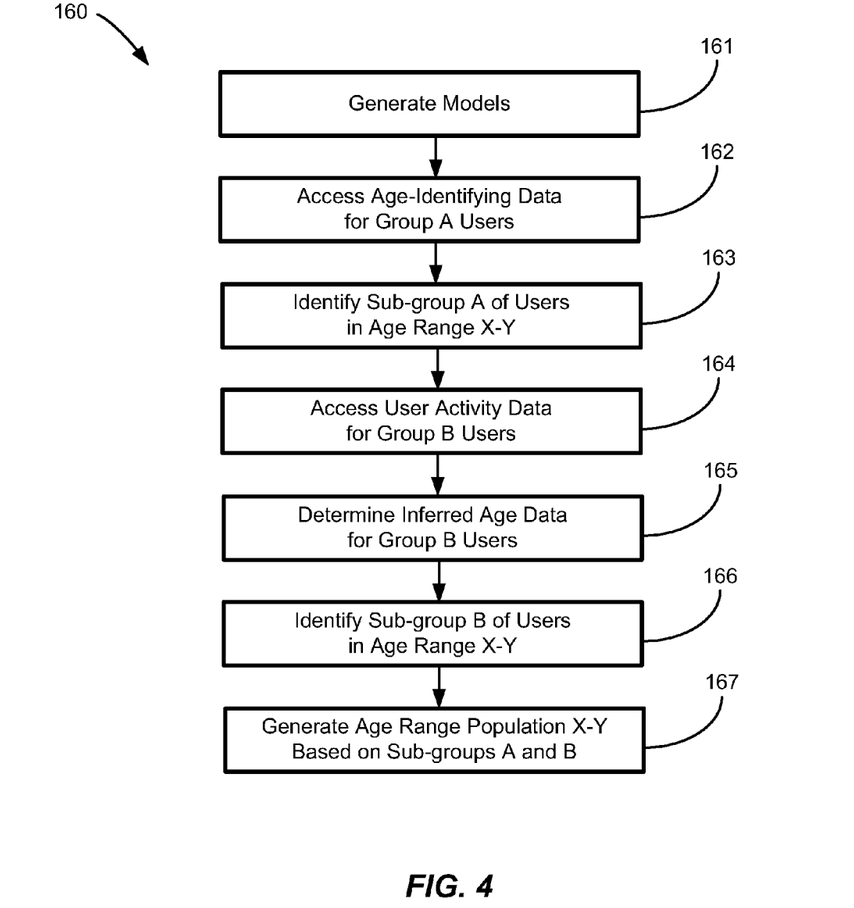

FIG. 4 illustrates an example process 160 for generating an age range population (Age Range Population X-Y) for a particular age range (Age Range X-Y) that may be (a) used directly as an age range product by ad server 106 and web server 108 or (b) combined with one or more other age range populations to form a combination age range product for use by ad server 106 and web server 108, according to certain embodiments.

At step 161, modeling engine 102 may generate various age range models and age prediction models for generating various age range populations and age range products. At step 162, product generation engine 104 may access age-identifying data 130 identifying an age for each of a first group (Group A) of network users. Age-identifying data 130 may include age data entered by network users themselves (while registering for an online network, service, or application) or entered by an administrator or other user. At step 163, product generation engine 104 may identify a sub-group (Sub-group A) of Group A users having an identified age within Age Range X-Y based at least on the age-identifying data 130 for each Group B user.

At step 164, product generation engine 104 may access user-activity data 132 for a second group (Group B) of network users. The user-activity data 132 may include data regarding the Group B users' actions on one or more relevant networks. Group B may be the same as Group A, may partially overlap Group A, or may be completely distinct from Group A, depending on the particular implementation or particular set of users being analyzed.

At step 165, product generation engine 104 may determine inferred age data 134 for each of Group B user by applying various age prediction rules 124 from modeling engine 104 to user-activity data 134 for each Group B user. The inferred age data 134 may indicate mathematical probabilities, or "confidence levels," of each Group B user falling within each of a number of different age groups 122.

At step 166, product generation engine 104 may identify a sub-group (Sub-group B) of Group B users having a predicted age within Age Range X-Y based at least on the inferred age data 134 for each Group B user. For example, for each user, product generation engine 104 may compare the determined confidence levels for each of the number of different age ranges to threshold confidence level(s) specified for such age ranges. If the user's confidence level for Age Range X-Y exceeds the threshold confidence level specified for Age Range X-Y, product generation engine 104 may include the user in the Sub-group B. As used herein, "exceeding" a threshold may or may not include meeting the threshold exactly, depending on the particular implementation. Age prediction rules 124 may specify any suitable rules for handling situations in which a particular user qualifies for multiple non-overlapping age ranges.

Sub-group B may be the same as Sub-group A, may partially overlap Sub-group A, or may be completely distinct from Sub-group A, depending on the particular implementation or particular set of users being analyzed. It should be understood that the actual age of one or more of the identified Sub-group A users, and one or more of the identified Sub-group B users, may not in fact fall within Age Range X-Y. The models and rules generated by modeling engine 102 may be selected and/or modified in order to control the accuracy of such identified sub-groups, e.g., by attempting to control the numbers of false positives and false negatives.

At step 167, product generation engine 104 may generate Age Range Population X-Y based at least on the identified Sub-group A users and Sub-group B users. For example, in some embodiments, if it is known that Sub-groups A and B do not overlap (i.e., share no common users), product generation engine 104 may simply aggregate Sub-groups A and B to arrive at Age Range Population X-Y. As another example, in some embodiments, if Sub-groups A and B are partially or fully overlapping, product generation engine 104 may include all users in either Sub-group A or B in Age Range Population X-Y, and account for users common to Sub-groups A and B (i.e., by not double-counting them). As another example, product generation engine 104 may group users common to Sub-groups A and B into an additional "high-accuracy" age range population, which may be useful to ad server 106.

As another example, in some embodiments, product generation engine 104 may apply particular rules for determining whether to include users that fall into one of Sub-groups A and B, but not the other, into Age Range Population X-Y. For example, the age-identifying data 130 for certain users indicate that such users fall within Age Range X-Y, but the inferred data 134 for the same users may indicate that the users do not fall within Age Range X-Y (e.g., the inferred data 134 may indicate that each of such users falls within a different age range, or no age range at all). Product generation engine 104 may apply any suitable combination rules 128 for determining whether to include such users in Age Range Population X-Y, e.g., any of the tiebreak rules discussed above in Section B.4.

Figure 5:
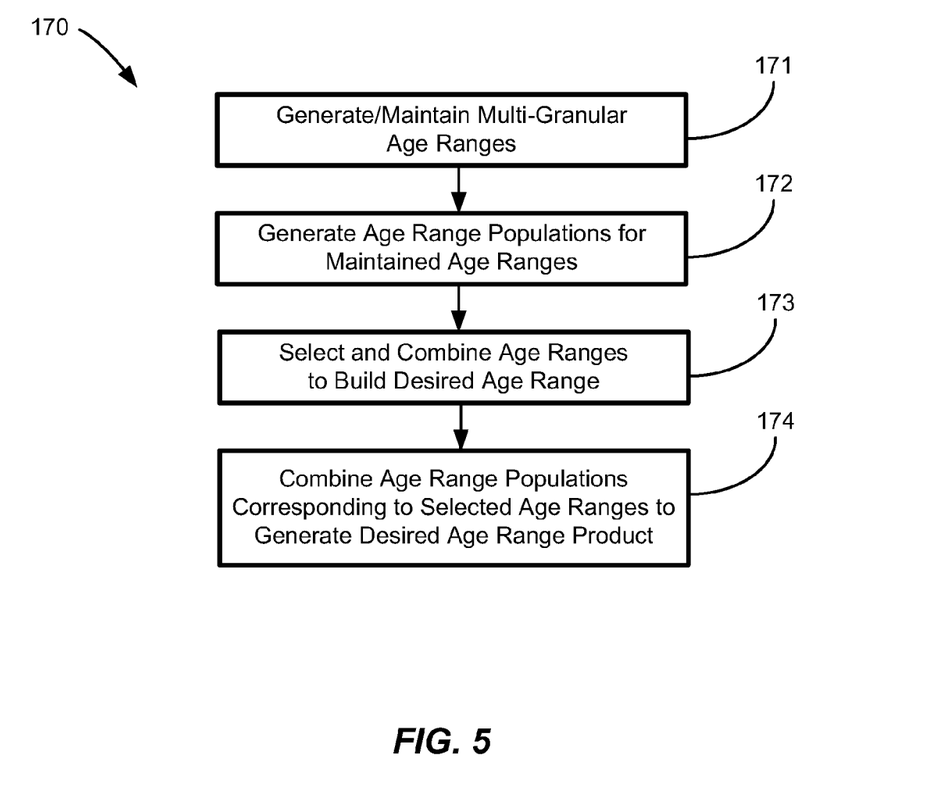

FIG. 5 illustrates an example process 170 for generating a multi-granular combination age range product (e.g., Age Range Product 18,59) for a particular age range (Age Range 18,59) that may be used by ad server 106 and web server 108, according to certain embodiments. At step 171, modeling engine 102 may generate and/or maintain multiple age range brackets 122, including sets of one or more age range brackets 122 at different levels of granularity. For example, modeling engine 102 may generate four sets age ranges at four levels of granularity, as shown below:

Granularity Level 1: (13,17) (18,24) (25,29) (30,34) (35, 39) (40,44) (45,49) (50,54) (55,59) (60,64) (65+);
Granularity Level 2: (20,29) (30,39) (40,49) (50,59) (60+);
Granularity Level 3: (25,49); and
Granularity Level 4: (18,100)

At step 172, product generation engine 104 may populate some or all of the age ranges 122 maintained by modeling engine 102, i.e., to generate age range populations corresponding to individual age ranges. Product generation engine 104 may use any of suitable techniques (e.g., as discussed above regarding method 160 or as otherwise disclosed herein) to generate age range populations for one or more age ranges 122.

At step 173, product generation engine 104 may apply combination rules 128 to combine two or more age ranges 122 maintained by modeling engine 102 to arrive at the specified Age Range 18,59. In some implementations, combination rules 128 may specify to combine the largest (i.e., least granular) maintained age ranges 122 that can be combined to provide the desired age range, which will typically produce a more inclusive and accurate group of users as compared to prior techniques. Applying such combination rules 128 to the current example, product generation engine 104 would combine (25,49), (50,59), and (18, 24), which includes age ranges from three different granularity levels.

After selecting the age ranges to combine, product generation engine 104 may then combine the corresponding age range products at step 174 to arrive at Age Range Product 18,59. Thus, product generation engine 104 may combine the age range products (25,49), (50,59), and (18,24), each generated at step 172, to result in Age Range Product 18,59. In implementations in which users are not permitted to be included in multiple non-overlapping age range populations, the age range populations (25,49), (50,59), and (18,24) may simply be combined to result in Age Range Product 18,59. In implementations in which users are permitted to be included in multiple non-overlapping age range populations, product generation engine 104 may identify users common to any two (or all three) of age range populations (25,49), (50,59), and (18,24), and account for such users in any suitable manner (e.g., using any of the tiebreak rules discussed above in Section B.4).

C. Example Computing System Architectures

While the foregoing systems can be implemented by a wide variety of physical systems and in a wide variety of network environments, the client and server host systems described below provide example computing architectures for didactic, rather than limiting, purposes.

Figure 6:
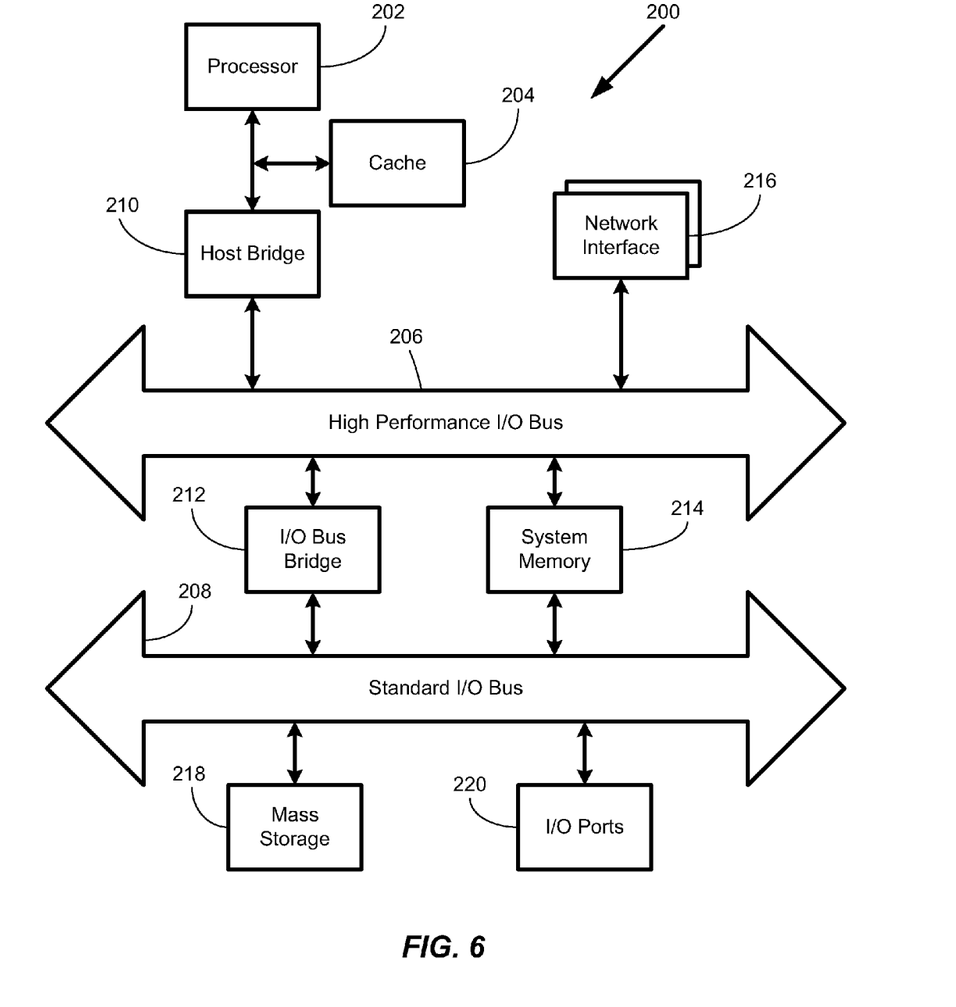
FIG. 6 is a schematic diagram illustrating an example computing system architecture that may be used to implement one or more of physical servers.

FIG. 6 illustrates an example computing system architecture, which may be used to implement a physical server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like. Of course, other implementations are possible. For example, the server functionalities described herein may be implemented by a plurality of server blades communicating over a backplane.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present invention has been explained with reference to specific embodiments. For example, while embodiments of the present invention have been described as operating in connection with HTML and HTTP, the present invention can be used in connection with any suitable protocol environment. Other embodiments will be evident to those of ordinary skill in the art. It is therefore not intended that the present invention be limited, except as indicated by the appended claims.

What is claimed is:

1. A method for generating an age range product for online marketing, the method comprising:
    receiving age-identifying data identifying an age for each of a first group of network users, wherein the first group of network users includes users that have visited a particular online website and have entered the age-identifying data during online registration;
    tracking network user usage information associated with the first group of network users including web browsing activity and duration of activity, user actions on a social network, interactions with other users, online purchasing, and online memberships of the user;
    determining usage patterns in the network user usage information including browsing and transaction behavior;
    formatting and storing network user usage information and usage patterns as user-activity data;
    accessing, over the Internet, user-activity data for a second group of network users, the user-activity data including data regarding the second group of network users' actions on the network, wherein the second group of network users includes users that have visited the particular online website and have entered false age-identifying data;
    determining inferred age data for each of the second group of network users based at least on the user-activity data for each of the second group of network users;
    selecting an age range by applying tiebreak rules to determine the age range with the highest determined confidence level from (a) the age-identifying data for the first group of network users and (b) the inferred age data for the second group of network users when the inferred age data and the age-identifying data do not match;
    generating a marketing-related age range product for the particular age range based at least on the selected age range
    determining, based on user identity information including a user IP address and an account identifier associated with a retrieval request, whether a particular user is currently online, wherein the user matches the selected age range and an advertiser-specified age range; and
    transmitting advertiser sponsored content based on the marketing-related age range product to the particular user while the particular user is online and subsequently accessing the particular online website.

2. The method of claim 1 comprising:
    identifying a first sub-group of users having an identified age within the particular age range based at least on the age-identifying data for each of the first group of network users;
    identifying a second sub-group of users having a predicted age within the particular age range based at least on the inferred age data for each of the second group of network users; and
    generating the marketing-related age range product for the particular age range based at least on the identified first sub-group of network users and the identified second sub-group of network users.

3. The method of claim 2 wherein:
    the actual ages of one or more of the first sub-group of users having an identified age within the particular age range do not actually fall within the particular age range; and
    the actual ages of one or more of the second sub-group of users having a predicted age within the particular age range do not actually fall within the particular age range.

4. The method of claim 2 wherein identifying a second sub-group of users having a predicted age within the particular age range based at least on the inferred age data for each of the second group of network users comprises, for each of the second group of network users:
    determining a confidence level regarding whether that network user falls within the particular age range based at least on the inferred age data for that network user;
    comparing the determined confidence level to a threshold confidence level; and
    including that network user in the second sub-group of users if the determined confidence level exceeds the threshold confidence level.

5. The method of claim 2 wherein generating the marketing-related age range product for the particular age range includes combining the identified first sub-group of network users having an identified age within the particular age range with the identified second sub-group of network users having a predicted age within the particular age range.

6. The method of claim 1 wherein the first sub-group of network users at least partially overlaps with the second sub-group of network users.

7. The method of claim 1 wherein the first group of network users at least partially overlaps with the second group of network users.

8. The method of claim 1 wherein determining inferred age data for each of the second group of network users comprises, for each of the second group of network users, determining a probability of whether that network user falls within the particular age range, based at least on the user-activity data for the particular network user.

9. The method of claim 1 wherein the age-identifying data for at least some of the first group of network users is self-reported by the network users via the network.

10. The method of claim 1 further comprising receiving the age-identifying data for at least some of the first group of network users during an online user registration process for those network users.

11. An apparatus, comprising:
    one or more processors;
    one or more network interfaces;
    a memory; and
    computer-executable instructions carried on a computer readable medium, the instructions readable by the one or more processors, the instructions, when read and executed, for causing the one or more processors to:

receive age-identifying data identifying an age for each of a first group of network users, wherein the first group of network users includes users that have visited a particular online website and have entered the age-identifying data during online registration;

track network user usage information associated with the first group of network users including web browsing activity and duration of activity, user actions on a social network, interactions with other users, online purchasing, and online memberships of the user;

determine usage patterns in the network user usage information including browsing and transaction behavior;

format and store network user usage information and usage patterns as user-activity data;

access, over the Internet, user-activity data for a second group of network users, the user-activity data including data regarding the second group of network users' actions on the network, wherein the second group of network users includes users that have visited the particular online website and have entered false age-identifying data;

determine inferred age data for each of the second group of network users based at least on the user-activity data for each of the second group of network users;

select an age range by applying tiebreak rules to determine the age range with the highest determined confidence level from (a) the age-identifying data for the first group of network users and (b) the inferred age data for the second group of network users when the inferred age data and the age-identifying data do not match;

generate a marketing-related age range product for the particular age range based at least on the selected age range determine, based on user identity information including a user IP address and an account identifier associated with a retrieval request, whether a particular user is currently online, wherein the user matches the selected age range and an advertiser-specified age range; and transmit advertiser sponsored content based on the marketing-related age range product to the particular user while the particular user is online and subsequently accessing the particular online website.

12. The apparatus of claim 11, including computer-executable instructions for:

identifying a first sub-group of users having an identified age within the particular age range based at least on the age-identifying data for each of the first group of network users;

identifying a second sub-group of users having a predicted age within the particular age range based at least on the inferred age data for each of the second group of network users; and generating the marketing-related age range product for the particular age range based at least on the identified first sub-group of network users and the identified second sub-group of network users.

13. The apparatus of claim 11 wherein generating the marketing-related age range product for the particular age range includes combining the identified first sub-group of network users having an identified age within the particular age range with the identified second sub-group of network users having a predicted age within the particular age range.

14. The apparatus of claim 11 wherein the first sub-group of network users at least partially overlaps with the second sub-group of network users.

15. The apparatus of claim 11 wherein determining inferred age data for each of the second group of network users comprises, for each of the second group of network users, determining a probability of whether that network user falls within the particular age range, based at least on the user-activity data for the particular network user.

16. An article of manufacture comprising:

a computer readable medium; and computer-executable instructions carried on the computer readable medium, the instructions readable by a processor, the instructions, when read and executed, for causing the processor to:

receive, over the Internet, age-identifying data identifying an age for each of a first group of network users, wherein the first group of network users includes users that have visited a particular online website and have entered the age-identifying data during online registration;

track network user usage information associated with the first group of network users including web browsing activity and duration of activity, user actions on a social network, interactions with other users, online purchasing, and online memberships of the user;

determine usage patterns in the network user usage information including browsing and transaction behavior;

format and store network user usage information and usage patterns as user-activity data;

access, over the Internet, user-activity data for a second group of network users, the user-activity data including data regarding the second group of network users' actions on the network, wherein the second group of network users includes users that have visited the particular online website and have entered false age-identifying data;

determine inferred age data for each of the second group of network users based at least on the user-activity data for each of the second group of network users;

select an age range by apply[ing] tiebreak rules to determine the age range with the highest determined confidence level from (a) the age-identifying data for the first group of network users and (b) the inferred age data for the second group of network users when the inferred age data and the age-identifying data do not match;

generate a marketing-related age range product for the particular age range based at least on the selected age range determine, based on user identity information including a user IP address and an account identifier associated with a retrieval request, whether a particular user is currently online, wherein the user matches the selected age range and an advertiser-specified age range; and transmit advertiser sponsored content based on the marketing-related age range product to the particular user while the particular user is online and subsequently accessing the particular online website.

17. The article of manufacture of claim 16, including computer-executable instructions for:

identifying a first sub-group of users having an identified age within the particular age range based at least on the age-identifying data for each of the first group of network users;

identifying a second sub-group of users having a predicted age within the particular age range based at least on the inferred age data for each of the second group of network users; and generating the marketing-related age range product for the particular age range based at least on the identified first sub-group of network users and the identified second sub-group of network users.

18. The article of manufacture of claim 16 wherein generating the marketing-related age range product for the particular age range includes combining the identified first sub-group of network users having an identified age within the particular age range with the identified second sub-group of network users having a predicted age within the particular age range.

19. The article of manufacture of claim 16 wherein the first sub-group of network users at least partially overlaps with the second sub-group of network users.

20. The article of manufacture of claim 16 wherein determining inferred age data for each of the second group of network users comprises, for each of the second group of network users, determining a probability of whether that network user falls within the particular age range, based at least on the user-activity data for the particular network user.

* * * * *